United States Patent Office 3,023,201
Patented Feb. 27, 1962

3,023,201
PROCESS FOR REMOVAL OF CATALYST FROM HYDROGENATED POLYMER SOLUTIONS
Charles W. Moberly and Samuel Renaudo, Bartlesville, Okla., assignors to Phillips Petroleum Company, a corporation of Delaware
No Drawing. Filed Oct. 26, 1955, Ser. No. 543,014
11 Claims. (Cl. 260—94.7)

This invention relates to the removal of catalyst from liquid organic materials. In one aspect, the invention relates to the removal of hydrogenation catalyst from a solution of a hydrogenated polymer of butadiene. In another aspect, the invention relates to the removal of nickel-kieselguhr catalyst from a solution of hydrogenated polybutadiene.

There is disclosed in a copending U.S. application of Jones and Moberly, Serial No. 395,291, filed November 30, 1953, now Patent No. 2,864,809, a process for the production of thermoplastic materials prepared by hydrogenating rubbery polymers of butadiene. These materials can be advantageously used to make fibers, filaments, dishes, containers, films, sheetings, toys, gaskets, tubing, coating materials, protective coverings, white sidewalls for tires, and many other articles. They are particularly suitable for Arctic service because they are flexible at very low temperatures.

The hydrogenated polymers are prepared by a catalytic hydrogenation procedure. In carrying out the hydrogenation process, a butadiene polymer, substantially free of salts or other materials which might act as hydrogenation catalyst poisons, is fed to a hydrogenation reactor in the form of a solution or dispersion in a suitable solvent. In some instances, the polymers dissolve completely while in other cases a dispersion is formed.

The polymers used in producing these new thermoplastic materials are selected from rubbery homopolymers of butadiene and copolymers of butadiene and styrene using not more than 30 parts by weight of styrene per 100 parts by weight of monomers. These polymers are prepared by emulsion polymerization, the temperature for the polymerization ranging from −5° to 140° F., preferably about 20° F. to 60° F. Polymers of butadiene prepared at 41° F. have produced hydrogenated materials possessing the best balance of properties. The polymer to be hydrogenated should have a Mooney viscosity below 40 (ML–4) measured at 212° F.; however, polymers of higher Mooney viscosity can be used following milling or other suitable degradation of the polymer prior to hydrogenation.

The catalyst used in the hydrogenation of butadiene polymer is a nickel-kieselguhr catalyst, having a particle size between 1 and 8 microns, which has been activated at a temperature preferably between 500 and 800° F. for a period of several hours by passing hydrogen thereover. While catalysts of larger particle size can be used, they are not as satisfactory. One catalyst, which has been found to be quite suitable, is a nickel-kieselguhr catalyst treated at 675° F. for 4 hours using approximately 100 volumes of hydrogen per volume of catalyst. Such treatment provides a reduced nickel content of about 40 percent. From 2 to 30 weight percent of the catalyst on the unreduced basis, based upon the weight of the polymer, gives a preferred rate of hydrogenation.

Many solvents can be used to dissolve the polymer, but the ones which are preferred are the cycloparaffins containing 5 or 6 carbon atoms in the ring and their alkyl derivatives. Solvents such as cyclopentane, methylcyclopentane, dimethylcyclopentane, ethylcyclopentane, cyclohexane, methylcyclohexane, and dimethylcyclohexane are examples of these solvents, the preferred solvent being methylcyclohexane. Mixtures of these solvents can also be used. Furthermore, it is not necessary to employ the pure cycloparaffins, the commercial grades being satisfactory. For example, the commercial grade of cyclopentane has been found to contain cyclopentane as well as paraffins such as 2,2-dimethylbutane, normal pentane and diisopropyl. Commercial methylcyclopentane actually contains about 55 to 75 percent of this material, the remainder being normal hexane, benzene and cyclohexane. Isoheptanes, 2,4-dimethylpentane, and 1,1-dimethylcyclopentane are frequently present in commercial cyclohexane. In methylcyclohexane, toluene, normal heptane and small amounts of cis-1,2-dimethylcyclopentane are usually present. Other solvents which can be used include mixtures of naphthenes and paraffins. The paraffin content of these latter mixtures preferably does not exceed about 35 percent paraffins because higher concentrations would lower the solubility of the polymer. Small amounts of aromatic hydrocarbons can be included in the solvent although they are not preferred because of lowered hydrogenation rates and deterioration of the product (lowered tensile strength) if present in appreciable amounts.

Only dilute solutions of the polymer can be effectively utilized in the hydrogenation process. Solutions containing from 1 to 15 weight percent polymer are generally employed because at higher concentrations of polymer the solutions are too viscous for satisfactory use in the process. It is preferred to use solutions containing from 1 to 10 weight percent of the polymer.

After the polymer is dissolved in the solvent, the hydrogenation catalyst is added. The mixture is then introduced into a reactor, hydrogen is added, and the temperature raised to a suitable level to initiate the reaction. This operation can be carried out in a batchwise or a continuous process. Reaction pressures are preferably in the range of atmospheric to 3000 p.s.i.g., the usual range being from 100 to 1000 p.s.i.g. The temperature can vary from 75° F. up to the degradation temperature of the polymer or the critical temperature of the solvent, the maximum temperatures reaching as high as 575° F. The preferred temperature range is between 300 and 525° F. Reaction times in the range of 1 to 24 hours, preferably from 2 to 12 hours, are utilized.

In order to obtain hydrogenated polymers of the desired characteristics, the unsaturation should be reduced to a value of about 0 to 50 percent, based upon the theoretical value of 100 percent for the unhydrogenated polymer. Preferably the hydrogenation is continued until the residual unsaturation is less than 30 percent.

One difficulty which has been encountered in carrying out the hydrogenation process concerns the removal of catalyst from the reactor effluent. Various methods have been tried to effect the desired separation, such as filtration and centrifugation, but such methods fail to remove the more finely divided catalyst. Furthermore, it has been found that settling of the reactor effluent for as long as two weeks does not facilitate removal of the catalyst.

We have now discovered that by treating the solution of hydrogenated polymer containing finely divided catalyst with rosin acids and iron and nickel salts of rosin acids it is possible to separate substantially all of the catalyst from the solution. The organic salts utilized in the process of this invention include not only the iron and nickel salts of acids and mixtures of acids found in natural rosins, but also the iron and nickel salts of acids and acid mixtures resulting from hydrogenation and dehydrogenation and from the well known disproportionation of acids present in natural rosin. While the process of this invention is especially applicable to the removal of suspended, finely divided nickel catalyst from solutions of hydrogenated polymer, it can also be used in the treatment of liquid materials in general in order to remove a finely divided solid material. For example, the process can be used to separate finely divided catalyst from hydrogenated vegetable oils. The rosin acids and related compounds used in the process of this invention are well known and are described in the literature, e.g., in U.S. Patent No. 2,679,497 issued to C. A. Uraneck and S. H. Landes and in an article by J. T. Hays et al. appearing in Industrial and Engineering Chemistry, volume 39, pages 1129–1132.

Broadly speaking, the instant invention resides in a process which comprises adding to a liquid material containing finely divided solids a member selected from the group consisting of natural rosin acids, hydrogenation, dehydrogenation, and disproportionation reaction products thereof having the same number of carbon atoms per molecule and the same arrangement of carbon atoms as said natural rosin acids, and iron and nickel salts of said rosin acids, and said hydrogenation, dehydrogenation and disproportionation reaction products of said rosin acids; adding a base whose cation forms an insoluble salt of a rosin acid; and separating said liquid material substantially free of solids from the resultnig precipitate. In practicing this process, sufficient of the additive material is utilized so as to finally form a precipitate which contains substantially all of the dispersed solids. It has been found that the use of between 0.25 and 5 grams of additive material per gram of solid material gives satisfactory results. With regard to the addition of the base, enough of this material is added as will cause the precipitation of all of the additive material.

In one embodiment of the invention, there is added to a 1 to 15 weight percent solution of a hydrogenated polymer, such as hydrogenated polybutadiene, between 0.25 and 5 grams of an iron or nickel salt of a rosin acid as described above per gram of catalyst. The polymer solution is heated to dissolve the added material after which the solution is made alkaline with a base, such as an alkali metal hydroxide, ammonium hydroxide or the like, and then mixed. The solution is then allowed to stand for a period of 5 minutes to 16 hours or more at a temperature sufficiently high to prevent precipitation of the polymer. This temperature is generally in the range of 90 to 200° F. After this digestion period, there is added an alkaline earth metal hydroxide, such as calcium, strontium or barium hydroxides, in an amount at least equivalent to the amount of alkali metal or ammonium hydroxide previously added. As a result of adding the alkali metal or ammonium hydroxide and the alkaline earth metal hydroxide, as indicated above, two precipitates are formed one at a time, i.e. firstly a nickel or iron hydroxide and secondly an alkaline earth metal salt of the rosin acid. The precipitates containing substantially all of the finely divided catalyst originally present in the solution of hydrogenated polymer is then separated from the solution by means of centrifugation, sedimentation or other suitable means.

In a preferred embodiment of the invention, the step of adding an alkali metal hydroxide or ammonium hydroxide, as described above, is omitted from the process, and the alkaline earth metal hydroxide is added directly to the solution of hydrogenated polymer containing dissolved iron or nickel salt of the rosin acids. When carrying out the process in this manner, the two precipitates, i.e. the iron or nickel hydroxide and the alkaline earth metal salt of the rosin acid, are formed at the same time rather than one at a time as described hereinabove. This same procedure is of course followed when natural rosin acids and hydrogenation, dehydrogenation and disproportionation reaction products of rosin acids are dissolved in the hydrogenated polymer solution. When utilizing these latter materials only one precipitate is formed, i.e., the alkaline earth metal salt of the rosin acids.

The process of this invention can often be advantageously employed in the combination with other separation methods such as centrifugation or filtration. In some instances these latter methods are effective in initially removing a major proportion of a suspended catalyst, e.g. up to as high as 95 percent. The solution of hydrogenated organic material containing a minor amount of suspended finely divided catalyst can then be effectively treated in accordance with the process of this invention so as to obtain an overall catalyst removal of 99 percent and higher.

A more comprehensive understanding of the invention can be obtained by referring to the following illustrative examples, which are not intended, however, to be unduly limitative of the invention.

EXAMPLE I

An average 23 Mooney (ML–4) polybutadiene was prepared in two batches by emulsion polymerization of butadiene at 41° F. in a sulfoxylate recipe. Eight hundred grams of the polybutadiene were dissolved in 7 liters of methylcyclohexane. Sixty-six grams of nickel-kieselguhr catalyst in 1500 milliliters of methylcyclohexane were charged to a 5 gallon reactor followed by the addition of the polymer solution. Two thousand milliliters of methylcyclohexane, previously used to rinse the polymer charge pot, were then charged to the reactor. The reactor was then heated to 450° F. and pressured to 500 p.s.i.g. with hydrogen. These reaction conditions were maintained for 3 hours. The contents were then blown down into a tank containing about 15 liters of commercial mixed octanes and the reactor rinsed with 3 liters of methylcyclohexane. The reactor effluent was then centrifuged in a Fletcher clarifier at about 2100 r.p.m., and 80.2 percent of the catalyst, based on the ash content of the polymer, was thereby removed from the polymer solution. The following are properties of the effluent from the Fletcher clarifier:

Percent solids _____ 3.8
Percent ash (based on polymer) _____ 2.01
Percent nickel (based on polymer) _____ 1.21

In separate runs, iron and nickel salts of disproportionated rosin acid were added to 75 cubic centimeter samples of the above described effluent from the Fletcher clarifier. The samples were then heated to about 50° C. After mixing, 10 drops of concentrated ammonium hydroxide were added to each of the samples which were then again mixed. The samples were allowed to stand for 16 hours at 35° C. after which 10 cubic centimeters of saturated lime water were added to each sample. The samples were then mixed, and after allowing to stand for 30 minutes to observe settling rates, they were centrifuged in tubes at 2700 r.p.m. for 15 minutes. A clarified solution of each sample was separated by decantation.

The clarified solutions were dried and the polymer was ashed. The ash, after weighing, was dissolved in hydrochloric acid, and bromine water was added to oxidize the nickel. Ammonia was added to neutralize the excess bromine and the nickel content was determined colorimetrically by adding dimethylglyoxime and comparing with a distilled water sample in a Fischer photometer. The nickel content was read from a calibration curve previously prepared. In Table I hereinbelow, there is set forth the data for the several runs.

Table 1

| Coagulant | Quantity of coagulant added gms./100 gms. of polymer | Centrifuged sample | |
|---|---|---|---|
| | | Percent ash [1] | Percent nickel [1] |
| Nickel salt | 4.9 | 0.178 | 0.073 |
| Do | 2.4 | 0.326 | 0.157 |
| Do | 0.6 | 0.587 | 0.266 |
| Iron salt | 4.9 | 0.268 | 0.061 |
| Do | 2.4 | 0.360 | 0.125 |
| Do | 0.6 | 0.788 | 0.432 |
| Control [2] | 0 | 1.50 | 0.83 |

[1] Based on polymer.
[2] A sample treated in same manner but without addition of coagulant.

The nickel salt of disproportionated rosin acid used in this and succeeding examples was prepared by adding a water solution of nickel nitrate to a water solution of the potassium salt of disproportionated rosin acid until no additional precipitate was obtained. The precipitate of the nickel salt was filtered; washed three times with water, and dried in an oven at about 150° F. and under a vacuum of 27 inches of mercury. To prepare the iron salt, a water solution of iron chloride was added to a water solution of the potassium salt. The precipitate was washed twice with water and dried at about 130° F.

EXAMPLE II

To a 75 cubic centimeter sample of the Fletcher clarifier effluent, prepared as described in Example I, there was added 0.147 gram of the iron salt of disproportionated rosin acid. The sample was then warmed to about 50° C., and, after mixing, 10 drops of concentrated ammonium hydroxide were added. The mixture was then shaken for 5 minutes. Ten cubic centimeters of saturated lime water were then added, and the sample was centrifuged as described in Example I, and the clear polymer solution was decanted. The dried polymer was analyzed as in Example I, and found to contain 0.44 weight percent ash and 0.12 weight percent nickel based on the weight of polymer. A control sample treated in the same manner but without addition of coagulant contained 1.50 weight percent ash and 0.83 weight percent nickel based on the weight of polymer.

EXAMPLE III

To 75 cubic centimeter samples of the Fletcher clarifier effluent, prepared as described in Example I, there was added varying amounts of disproportionated rosin acid. Ten cubic centimeters of saturated lime water was added to each of the samples which were left overnight in an oven maintained at 35° C. The samples were then centrifuged as described in Example I, and the clear polymer solutions were decanted. The dried polymer samples were analyzed as described in Example I. In Table II hereinbelow, there is set forth the data of the several runs.

*Table II*

| Quantity of acid added gms./100 gms. polymer | Centrifuged sample | |
| --- | --- | --- |
| | Percent ash [1] | Percent nickel [1] |
| 5.0 | .095 | 0.005 |
| 2.5 | 0.179 | 0.014 |
| 0.5 | 0.213 | 0.033 |
| Control [2] | 1.50 | 0.83 |

[1] Based on polymer.
[2] A sample treated in the same manner but without addition of coagulant.

EXAMPLE IV

To a 75 cubic centimeter sample of the Fletcher clarifier effluent, prepared as described in Example I, there was added 0.10 gram of nickel salt of a disproportionated rosin acid. The sample was heated to 90° C. and then shaken to dissolve the nickel salt. Ten cubic centimeters of a saturated aqueous solution of calcium hydroxide (about 0.15 gm./100 ml.) were then added, and the sample was again shaken for 5 minutes. A portion of this sample was centrifuged at 2700 r.p.m.'s for 15 minutes. The partially clarified layer was decanted, and the polymer was precipitated in isopropyl alcohol. The polymer was vacuum dried at 150° F. Analysis of the polymer, as described in Example I, indicated that the sample contained 0.63 weight percent ash and 0.28 weight percent nickel based on the weight of the polymer. A control sample treated in the same manner but without addition of coagulant contained 1.50 weight percent ash and 0.83 weight percent nickel based on the weight of the polymer.

EXAMPLE V

The remaining portion of the treated sample of Example IV was allowed to stand in a 95° F. oven for a period of 2½ hours. The sample was then centrifuged and the polymer recovered as in Example IV. Analysis of the polymer indicated that it contained 0.37 weight percent ash and 0.13 weight percent nickel, based on the weight of the polymer.

Since the original reactor effluent contained 9.5 weight percent ash based on polymer, it can be seen that by proceeding in accordance with this invention an overall catalyst removal of from 92 to 99 weight percent, based on the ash content of the polymer, can be effected. Centrifugation without the use of the additive materials of this invention removes only about 84 weight percent of the catalyst as indicated by the control run. It is noted that the actual removal of catalyst from the solutions is somewhat higher than the ash figures indicate since the additives themselves would leave some ash in the polymer.

It will be evident to those skilled in the art that variations and modifications of the invention can be made upon study of the foregoing disclosure. Such variations and modifications are believed to be clearly within the spirit and scope of the invention.

We claim:
1. In the process for the production of hydrogenated material by hydrogenating polymeric material selected from the group consisting of homopolymers of butadiene and copolymers of butadiene containing not more than 30 percent by weight of styrene wherein said polymeric material is dispersed in a solvent and contacted with hydrogen in the presence of finely divided nickel-kieselguhr catalyst in order to reduce the unsaturation of said polymeric material, the method for removing said catalyst which comprises adding to the dispersion of said hydrogenated polymeric material, solvent and catalyst a member selected from the group consisting of natural rosin acids, hydrogenation, dehydrogenation, and disproportionation reaction products thereof having the same number of carbon atoms per molecule and the same arrangement of carbon atoms as said natural rosin acids, and iron and nickel salts of said rosin acids and said hydrogenation, dehydrogenation and disproportionation reaction products of said rosin acids; adding to the resulting mixture a base whose cation forms an insoluble salt of said rosin acid; and recovering said polymeric material dispersed in a solvent substantially free of catalyst.

2. The process of claim 1 in which said insoluble salt of said rosin acid containing said catalyst is separated from said mixture by centrifugation.

3. The process of claim 1 in which said base is an alkaline earth metal hydroxide.

4. The process of claim 1 in which disproportionated rosin acid is added to said dispersion.

5. The process of claim 1 in which iron salt of disproportionated rosin acid is added to said dispersion.

6. The process of claim 1 in which nickel salt of disproportionated rosin acid is added to said dispersion.

7. The process of claim 1 in which said polymeric material is a homopolymer of butadiene.

8. In the process for the production of hydrogenated material by hydrogenating polymeric material selected from the group consisting of homopolymers of butadiene and copolymers of butadiene containing not more than 30 percent by weight of styrene wherein said polymeric material is dispersed in a solvent and contacted with hydrogen in the presence of finely divided nickel-kieselguhr catalyst in order to reduce the unsaturation of said polymeric material, the method for removing said catalyst which comprises initially separating a major proportion of the catalyst contained in said dispersion; adding to said dispersion containing the remainder of said catalyst a member selected from the group consisting of natural rosin acids, hydrogenation, dehydrogenation, and disproportionation reaction products thereof having the same number of carbon atoms per molecule and the same arrangement of carbon atoms as said natural rosin acids, and iron and nickel salts of said rosin acids and said hydrogenation, dehydrogenation and disproportionation reaction products of said rosin acids; adding to the resulting mixture a base whose cation forms an insoluble salt of said rosin acid, said insoluble salt containing substantially all of the catalyst remaining in said dispersion; and recovering said polymeric material dispersed in a solvent substantially free of catalyst.

9. The method of claim 8 in which said major proportion of catalyst contained in said dispersion is separated by centrifugation.

10. The method of claim 8 in which said major proportion of catalyst contained in said dispersion is separated by filtration.

11. In the process for the production of hydrogenated material by hydrogenating polymeric material selected from the group consisting of homopolymers of butadiene and copolymers of butadiene containing not more than 30 percent by weight of styrene wherein a solution of said polymeric material is contacted with hydrogen in the presence of finely divided nickel-kieselguhr catalyst in order to reduce the unsaturation of said polymeric material, the method for removing said catalyst which comprises adding to the solution of said hydrogenated polymeric material between 0.25 and 5 grams per gram of catalyst of an additive material selected from the group consisting of natural rosin acids, hydrogenation, dehydrogenation, and disproportionation reaction products thereof having the same number of carbon atoms per molecule and the same arrangement of carbon atoms as said natural rosin acids, and iron and nickel salts of said rosin acids and said hydrogenation; dehydrogenation and disproportionation reaction products of said rosin acids; maintaining the resulting mixture at a temperature in the range of about 90 to 200° F. for a petriod of from about 5 minutes to 16 hours; adding to said mixture a base whose cation forms an insoluble salt of said rosin acid, said base being added in an amount sufficient to precipitate all of said additive material; and separating said insoluble salt containing actalyst from said solution of hydrogenated polymeric material.

References Cited in the file of this patent

UNITED STATES PATENTS

| | | |
|---|---|---|
| 2,085,152 | Georgi | June 29, 1937 |
| 2,204,981 | Clough | June 18, 1940 |
| 2,568,950 | Crouch | Sept. 25, 1951 |
| 2,679,497 | Uraneck et al. | May 25, 1954 |
| 2,693,461 | Jones | Nov. 2, 1954 |
| 2,747,671 | Nowak et al. | May 29, 1956 |